(12) United States Patent
Zhang et al.

(10) Patent No.: US 11,689,044 B2
(45) Date of Patent: *Jun. 27, 2023

(54) SYSTEM FOR RECHARGING BATTERY WITH MOTION SENSOR

(71) Applicant: Lithium Power Inc., San Jose, CA (US)

(72) Inventors: Zhixian Zhang, Jinan (CN); Chit Fung So, Hong Kong (HK)

(73) Assignee: Lithium Power Inc., San Jose, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/646,147

(22) Filed: Dec. 28, 2021

(65) Prior Publication Data

US 2022/0123579 A1  Apr. 21, 2022

Related U.S. Application Data

(63) Continuation of application No. 16/815,801, filed on Mar. 11, 2020, now Pat. No. 11,228,196, which is a continuation-in-part of application No. 16/685,255, filed on Nov. 15, 2019, now Pat. No. 11,251,626.

(60) Provisional application No. 62/792,630, filed on Jan. 15, 2019.

(51) Int. Cl.
*H02J 7/00* (2006.01)
*H01M 10/44* (2006.01)
*H01M 10/42* (2006.01)
*H01M 10/052* (2010.01)

(52) U.S. Cl.
CPC ..... *H02J 7/007188* (2020.01); *H01M 10/052* (2013.01); *H01M 10/425* (2013.01); *H01M 10/44* (2013.01); *H02J 7/0013* (2013.01); *H02J 7/0047* (2013.01); *H02J 7/007182* (2020.01); *H01M 2010/4271* (2013.01)

(58) Field of Classification Search
CPC ................................................ H02J 7/007188
USPC ....................................................... 320/162
See application file for complete search history.

(56) References Cited

U.S. PATENT DOCUMENTS

| | | | | |
|---|---|---|---|---|
| 10,840,735 B1* | 11/2020 | Cooper | ..................... | H02J 3/32 |
| 10,879,727 B1* | 12/2020 | Cooper | ................... | H02J 9/062 |
| 10,892,618 B1* | 1/2021 | Cooper | ..................... | H02J 9/00 |
| 11,183,843 B1* | 11/2021 | Cooper | ..................... | H02J 3/38 |
| 2011/0106996 A1* | 5/2011 | Rosso | ................... | G06F 13/409 |
| | | | | 710/110 |
| 2016/0214501 A1* | 7/2016 | Yeom | ...................... | B60L 58/15 |
| 2018/0178674 A1* | 6/2018 | Yeom | ...................... | B60L 58/21 |

* cited by examiner

*Primary Examiner* — Jerry D Robbins

(74) *Attorney, Agent, or Firm* — Wang Law Firm, Inc.

(57) ABSTRACT

A battery with a battery management system is capable of charging the battery with recaptured energy from an energy regeneration device. The battery management system charges the battery with the energy regeneration device if the output voltage from the energy regeneration device is larger than the charging voltage of the battery.

14 Claims, 8 Drawing Sheets

SYSTEM FOR RECHARGING BATTERY WITH MOTION SENSOR

CROSS REFERENCE TO RELATED APPLICATION

This application is a continuation of U.S. patent application Ser. No. 16/815,801, filed on Mar. 11, 2020, which is a continuation-in-part of U.S. patent application Ser. No. 16/685,255, filed on Nov. 15, 2019, which is a non-provisional of U.S. Provisional Application 62/792,630, filed on Jan. 15, 2019, the entire specifications of which are incorporated herein by reference.

FIELD OF THE INVENTION

The present invention relates to a battery and more specifically to recharging the battery with recaptured energy.

BACKGROUND OF THE INVENTION

When a battery is placed on a moving vehicle, the energy from the battery is used to power diverse equipment in the vehicle. When the vehicle stops, the kinetic energy may be captured and used to charge the battery if the battery is equipped with a charger capable of using the recaptured energy.

Therefore, it is desired to have a battery with a battery management system that can use the recaptured energy to charge the battery.

SUMMARY OF THE INVENTION

In one embodiment, the invention is a method for recharging a battery equipped with a battery management system and connected to an energy regeneration device and a motion detection device. The method comprises receiving an output voltage from the energy regeneration device, receiving a motion indicator from the motion detection device, comparing the output voltage from the energy regeneration device with a charging voltage for the battery, and if the output voltage is larger than the charging voltage and the motion indicator indicates motion, then charging the battery with the energy regeneration device.

In another embodiment, the invention is a battery connected to an energy regeneration device that comprises a plurality of battery cells, a charger connected to the plurality of battery cells, a controller connected to the plurality of the battery cells and to the charger, and a motion detecting device connected to the controller, wherein the controller receives a motion indicator from the motion detecting device, and the controller enables a connection between the energy regeneration device and the charger to charge the plurality of battery cells if the motion indictor indicates motion and an output voltage from the energy regeneration device is larger than a charging voltage for the plurality of battery cells.

The present system and methods are therefore advantageous as they enable recharging of the battery with regenerated energy. Other advantages and features of the present invention will become apparent after review of the hereinafter set forth Brief Description of the Drawings, Detailed Description of the Invention, and the Claims.

DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

Figure 1A:
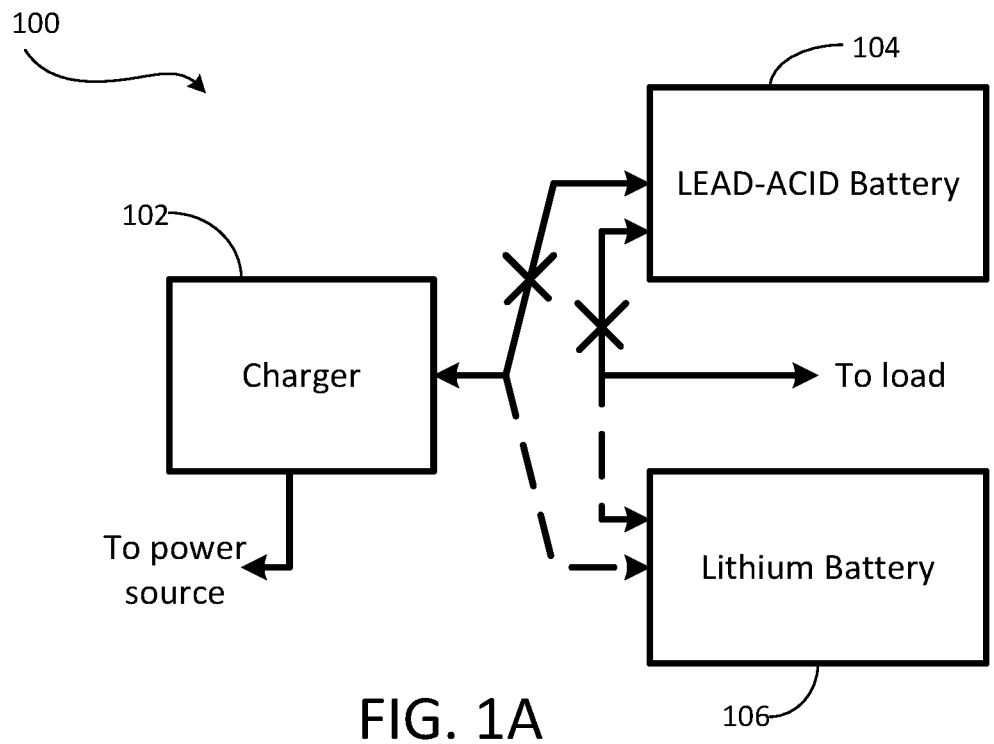
FIG. 1A depicts diagram 100 for battery replacement.

In this description, the term "application" as used herein is intended to encompass executable and non-executable software files, raw data, aggregated data, patches, and other code segments. The term "exemplary" is meant only as an example, and does not indicate any preference for the embodiment or elements described. Further, like numerals refer to like elements throughout the several views, and the articles "a" and "the" includes plural references, unless otherwise specified in the description. The terms lithium-based battery, lithium-ion battery, lithium-iron-phosphate battery, and lithium battery are used interchangeably and "battery" and "battery pack" are used interchangeably. The lithium battery in this specification refers to any type of lithium battery. The protective mode as used in the application refers to either under voltage protective mode or over voltage protective mode; the protective mode may also be referred to as sleep mode.

In an overview, the present invention provides an intelligent system and method for charging rechargeable batteries connected in parallel. The recharging circuit is controlled by voltage at output port of the rechargeable battery. The drop of the battery voltage is used to control the recharging circuit. When the output port voltage is less than the maximum discharge of the battery, the recharging circuit is turned off. When the output port voltage is greater than the maximum charging voltage of the battery, the recharging control circuit is turned on. The deviation between the maximum charging voltage and the maximum discharging voltage is used to control the recharging circuit for the rechargeable batteries connected in parallel.

Besides using the voltage differential to control the recharging circuit, the recharging operation is further controlled by a motion sensor or a displacement detection sensor. When movement of the vehicle with the rechargeable batteries is detected by the displacement detection sensor, the displacement detection sensor provides a signal to the recharging circuitry and the recharging circuitry is turned on and the recharging operation is allowed.

The displacement detection sensor is located inside the battery controller and connected to the MCU of the battery controller. By detecting a vibration signal and displacement data given by the displacement detection sensor, the battery controller determines whether the rechargeable battery is in a moving state. When the battery is in the moving state, the battery controller enables the recharging circuitry, allowing the battery cells to be recharged.

In order to prevent mutual interference between the batteries, isolation circuits are designed for battery packs connected in parallel. The isolation circuit affects the energy recovery by the battery packs. The energy that cannot be recovered may affect the operation of the battery system.

The system of the present invention uses the displacement detection and the displacement detection device to detect the movement change of the battery system. When the movement of the entire battery system changes, the battery control system is notified by the displacement detection device. The battery control system determines whether there is enough recyclable energy that needs to be absorbed based on the voltage detected at the output port. When there is enough recyclable energy, the recharging control circuit is turned on. By charging the rechargeable battery, the rechargeable battery absorbs the energy generated (recovered) by the motion control system. After the recovered energy is absorbed, the recharging control circuit is turned off to ensure isolation between the battery cells of the rechargeable battery system. For example, when the motion detection circuit detects that the motion of the battery system is decelerating, there may be generation of a recoverable energy; the displacement detection unit notifies the battery control system that the state of the motion of the battery system has changed, and the battery control system detects change voltage change at the external port of the battery system. When the external port voltage changes to 58V (taking a 48V battery system as an example), the battery control system turns on the recharging circuit to absorb the recovered energy of the motion system. At this time, the battery control system will continuously monitor the voltage at the output port. After the recoverable energy is absorbed, the recharging circuit is turned off when the port voltage drops to 54V to ensure isolation between the battery cells.

At the same time, the displacement detection module is used to determine whether the battery system is charged by the external charger or the recharge control module of the motion system and this determination is done by the information from the displacement of the motion system. When the external charger is used to charge the battery system, the state of the motion system is static. Only when the state of the motion system is in motion, it is possible for the recharge control module to charge the battery system. In the static state, only the external charger can be used to charge the battery. Based on this difference, separate control of charging by the external charger and the motion system based recharging is achieved.

Figure 2:
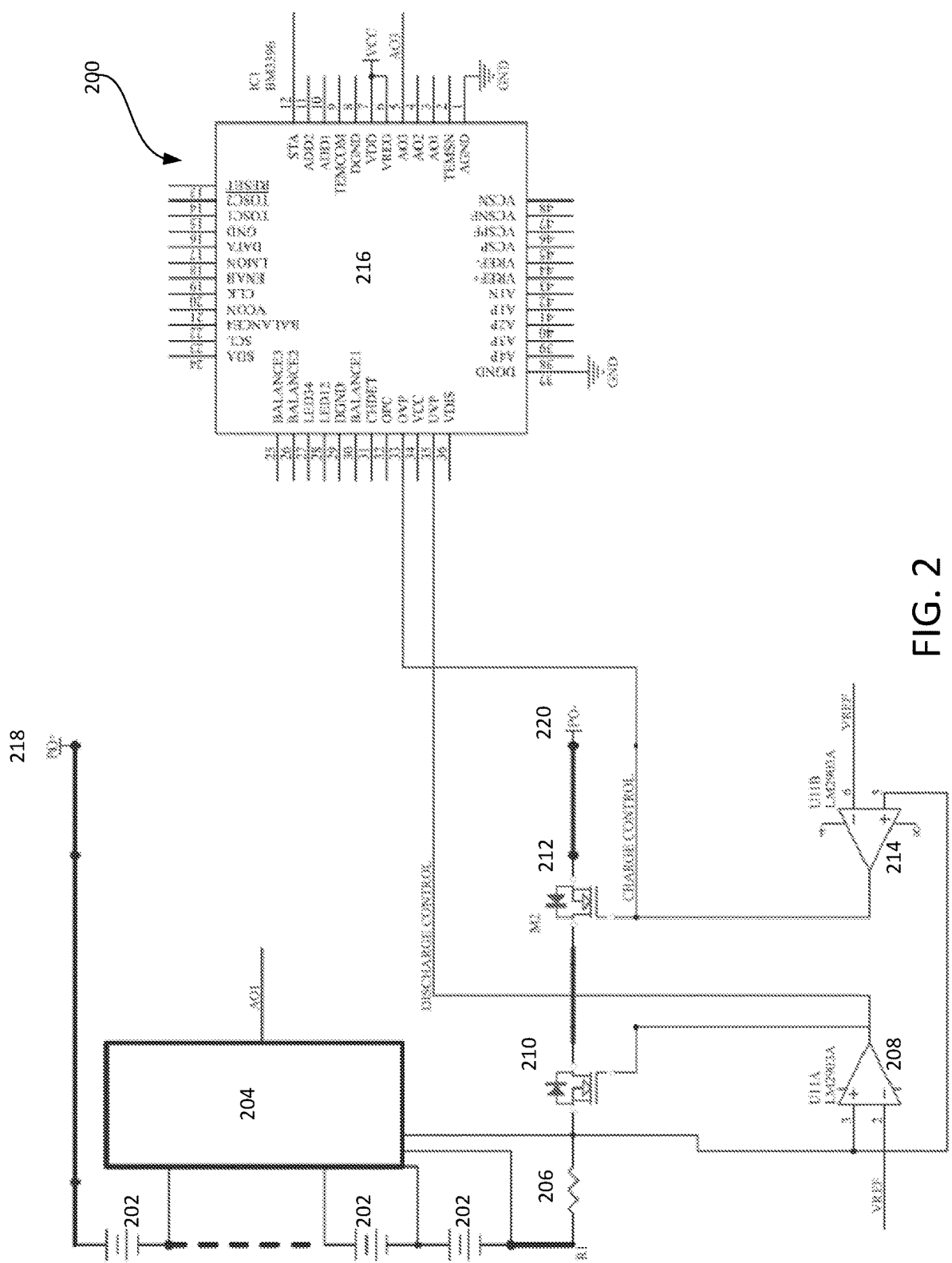
FIG. 2 depicts a circuit diagram 200 that illustrates charging and discharging circuits.

The present invention is an improvement of the system and method for enabling easy replacement of lead-acid battery by lithium-based battery while maintaining the same charging system designed for the lead-acid batteries. The system and method for replacement of lead-acid battery by lithium-based battery has the following features and advantages.

a. The rechargeable battery module of the present invention includes a main control module, a series and parallel rechargeable battery unit, a charge control switch, a discharge control switch, a discharge auxiliary switch, a single battery voltage acquisition module, a battery module current acquisition module, and a port capacitor as will be illustrated later in FIGS. 2, 3, and 4.

b. The rechargeable battery module is directly electrically connected, through an output port, to a lead acid battery charger and/or the load normally connected to the lead acid battery load as will be described later in the explanation of FIGS. 2 and 4.

c. The main control module enables the normal working voltage of the lead-acid battery at the output port through the opening and closing of the discharge module controlled by the PWM output and the voltage smoothing function of the C66, thus enabling the charging system of the original lead-acid battery system to work with the rechargeable battery module as will be made clear by FIG. 4 and related description.

d. The main control module also enables the normal working voltage of the lead-acid battery in the output port by controlling the opening and closing of the discharge auxiliary switch through the partial load of the series load and the port load, enabling the original lead-acid battery system to identify and accept the rechargeable battery modules as will be described by FIG. 2 and related description.

e. The main control module controls the charging and controlling switch on and off by PWM to mimic the rechargeable battery module, simulating the voltage and current characteristics of the lead-acid battery during the charging process, and enabling the original lead-acid battery system to identify and accept rechargeable battery modules as will be described by FIG. 4 and related description, f. The discharge control switch of the secondary rechargeable battery module is connected in parallel with a diode as shown in FIG. 2, In the charging mode, the discharge control switch is disconnected, and the charging current flows through the diode to realize mutual isolation between the batteries used in parallel, when the battery module is charged. When the current is greater than the set diode operating current limit (IREF), a comparator A operates to open the discharge switch to prevent the diode current from flowing out of range; when the current is less than IREF, the discharge control switch is automatically turned off to prevent possible mutual charging between the battery modules connected in parallel.

g. The charging control switch of the secondary rechargeable battery module is connected in parallel with the diode as shown in FIG. 2, hi the discharging mode, the charging control switch is disconnected, and the discharging current flows through the diode to realize mutual isolation between the batteries connected in parallel. When the discharging current of the battery module is greater than when the diode operating current limit (IREF), the comparator U11B turns on the discharge switch to prevent the diode current from exceeding the allowable range. When the current is less than IREF, the charging control switch is automatically turned off to prevent possible discharge between the battery modules connected in parallel.

The diagram 100 of FIG. 1A illustrates the objective of the present invention. The connecting diagram 100 illustrates a charger 102 connected to a power source (not shown) and to a lead-acid battery 104, which is connected to a load (not shown). The system of the present invention allows the replacement of the lead-acid battery 104 by a lithium-ion battery 106 while the same charger 102 is used. When replacing a lead-acid battery 104 by a lithium-ion battery 106, the replacement lithium-ion battery 106 must behave as the lead-acid battery 104 within the normal operating voltages, such that the charger 102 and the load (not shown) think they are interfacing with a lead-acid battery.

Figure 1B:
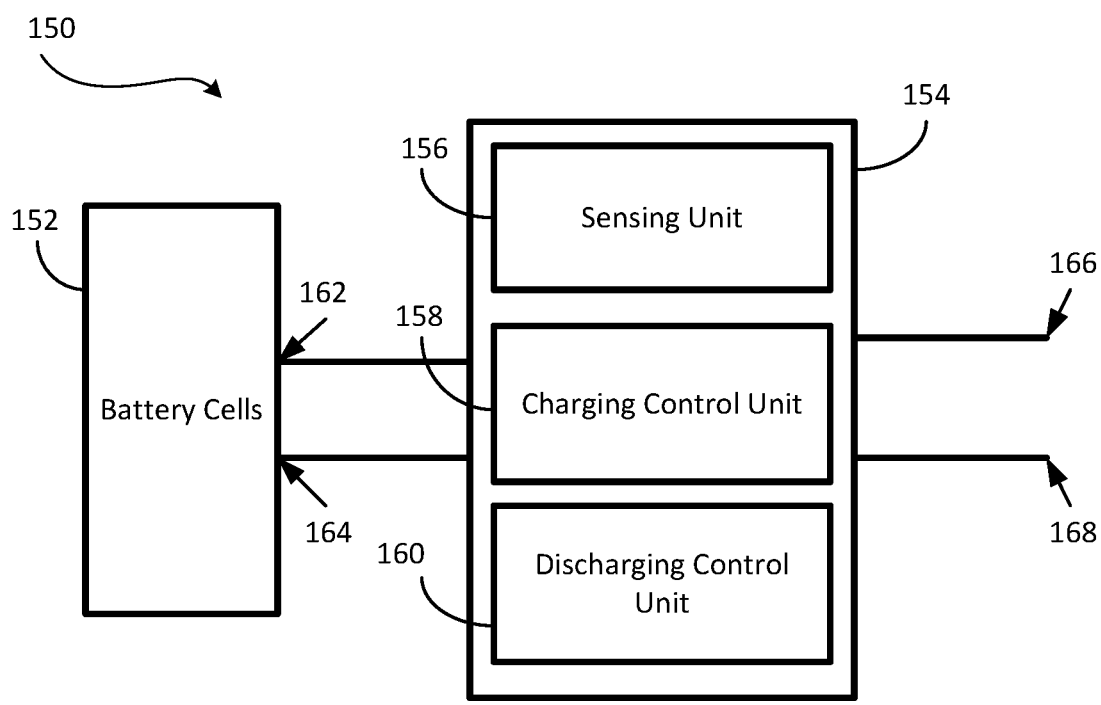
FIG. 1B depicts architecture 150 for battery replacement.

FIG. 1B illustrates architecture 150 of a replacement lithium-ion battery 106. The replacement lithium-ion battery 106 is composed of a plurality of battery cells 152 connected to a battery management system 154. The battery management system 154 has a sensing unit 156, a charging control unit 158, and a discharging control unit 160. The battery management system 154, through the sensing unit 156, monitors the voltage and the current at the output connectors 162, 164 of the battery cells 152 and also the voltage and the temperature at each of the battery cells. The battery management system 154 also monitors the voltage delivered at the output connectors 166, 168. The sensing unit 156, the charging control unit 158, and the discharging control unit 160 of the battery management system 154 are controlled by a controller.

During the discharge, when the voltage of a lithium-ion battery drops below a certain level, the lithium-ion battery normally shuts down and stops outputting any voltage as part of the normal battery protection procedure, while the voltage drop of a lead-acid battery is continuous and the lead-acid battery does not shut down the output voltage. For the lithium-ion battery to emulate the lead-acid battery, the lithium-ion battery needs to provide an output voltage even when the voltage level at the output connectors 162, 164 is low. To achieve this emulation, when the output voltage at the output connectors 162, 164 drops below a threshold level, the discharging control unit 160 is activated to deliver an output voltage at the output connectors 166, 168 that emulates the output voltage of a lead-acid battery.

During the battery charging process, the lithium-ion battery will interrupt the charging process by cutting off the connection to the terminals 166 and 168 when the voltage at the output connectors 162, 164 is above certain level to prevent the damage to the battery cells 152 while the lead-acid battery will continue to provide the connection between its battery cells to its output terminals. For the emulation purpose, if the voltage at the output connectors 162, 164 is above a predefined threshold level, which means the battery cells are almost fully charged, the charging control unit 158 is activated to prevent the battery cells 152 from outputting a large voltage and charging neighboring battery cells.

When replacing a bank of the lead-acid batteries with a bank of multiple lithium-ion batteries, the controlling of these lithium-ion batteries may be a problem. The direct parallel connection of multiple lithium-ion batteries may be difficult to control due to the difference in the state of charge between the batteries since the internal resistance of a lithium-ion battery is small, and the charging and discharging currents of one battery may damage another battery. The battery management system of the present invention enables the lithium-ion battery to emulate the characteristics of the lead-acid battery, thus enabling direct replacement of the lea-acid battery by the lithium-ion battery and re-use of the charger and other infrastructure.

The charger of the existing lead-acid battery system generally checks first the battery voltage, and only when the battery voltage is in the normal range of the lead-acid battery, the charging sequence is started. Because the lead-acid battery is directly connected to the charger, the lead-acid battery adopts the above approach as a way to protect the lead-acid battery and the charger. The lead-acid battery also needs to be protected from over charging and over discharging and the common way for this protection is to be disconnected from the charger and the load. The overcharging and over-discharging of the lithium-ion battery also pose similar safety concerns.

In order to ensure that the lithium-ion battery can be reliably used with the existing lead-acid battery charger, the battery management system uses the timing pulse control technology for controlling charging of the lithium-ion battery. The battery management system of the present invention also employs the timing control mode that enables voltage output periodically at the output terminals, so the charger can detect the battery. For example, the battery management system opens the discharging circuitry 10 seconds for every 240 seconds. By enabling periodic output instead of a continuous output when the battery has low charge, the lithium-ion battery can have a longer life. The battery management system, through use of resistors and MOSFETs, emulates output voltage through a pulse-width-modulation (PWM) mode (pulse mode), so the output voltage similar to the output voltage of the lead-acid battery is available at the output terminals of the lithium-ion battery. The battery management system controls the replacement lithium battery in such way that the lithium battery periodically enables output voltage in the pulse mode when the lithium battery enters the under voltage protection state, thus enabling the lithium battery to save its charge and to operate for an extended period until the lithium battery can be charged.

The battery management system of the present invention uses a MOSFET charge control unit 158 and a MOSFET discharge control unit 160 connected in series with battery cells in the lithium battery. When charging the lithium battery, only the MOSFET for the charge control unit 158 is turned on, so charging of the lithium ion battery cells connected in parallel can be realized, charging and discharging between lithium-ion batteries connected in parallel can be prevented, and the independence of each lithium battery is ensured. Similarly, during the discharging process, only the MOSFET for the discharge control unit 160 is turned on in the series circuit, and charging and discharging between the batteries can be avoided.

When replacing a bank of lead-acid batteries with a bank of lithium-ion batteries, several lithium-ion batteries with similar voltage level of the lead-acid battery are connected in parallel and an overcharging protective circuit is employed, so that the acid battery charger can complete the charging function for the lithium-ion battery pack without overcharging.

FIG. 2 is architecture 200 of a battery charging/discharging control system for one battery pack according to the present invention. FIG. 2 illustrates the control of one battery and multiple batteries can be combined to form a battery bank. Each battery is composed of a plurality of battery cells 202 connected in series. These battery cells are individually monitored through a level shifter 204, which sends the voltage and temperature information of each battery cell to the controller 216. The controller 216 can specify, through address selection, which cell to monitor. A plurality of the batteries are connected in parallel to the charger (not shown) through two connectors 218, 220 of the respective battery. Because the batteries are connected in parallel and different batteries may have different voltages, special attention must be made to prevent one battery from charging to another battery. This prevention is accomplished by a charging control unit MOSFET 210 and a discharging control unit MOSFET 212. During the charging process, the charging control MOSFET 210 is ON or OFF depending on the state of the charging process while the discharging control unit MOSFET 212 is always ON. The charging current passes through a diode connected in parallel to the charging control unit MOSFET 210 if the charging current is small; if the charging current is large, the charging control MOSFET 210 is turned on by charging switch 208 so the large charging current passes through the charging control MOSFET 210 and the overheating of the diode 210 is prevented. The charging switch 208 compares the charging voltage with a reference voltage and turns on the charging control MOSFET 210 if the voltage difference exceeds a predetermined difference. After the charging control MOSFET 210 is turned ON, the large charging current passes through the charging control MOSFET 210. At the beginning of charging operation, when the voltage at the battery cells 202 is low and the difference between the battery cells 202 and the reference voltage is large, the charging switch 208 turns the MOSFET 210 on, so a large charging current passes through. As the battery cells 202 are charged up, the voltage difference between the battery cells 202 and the reference voltage is small, the charging switch 208 turns off the MOSFET 210 and the a small charging current passes through the diode connected in parallel to the MOSFET 210.

When the discharge current is small, the discharge current flows through a diode connected in parallel to the discharge control MOSFET 212; if the discharge current is large, in order to prevent over-heating and deterioration of the diode, the discharge control MOSFET 212 is turned on by the discharge switch 214 and the discharge current flows through the discharge control MOSFET 212. The discharge control MOSFET 212 is turned on if the voltage difference measured by the discharging switch 214 between a predefined reference voltage and the voltage from the battery cells 202 is larger than a predefined value.

The system of the present invention also prevents the mutual charging between the battery packs during discharge. During the discharge, if a battery has higher voltage and larger current than other neighboring batteries, the charging of a battery by another battery pack with higher voltage is prevented because the battery has a lower discharging current has its discharging MOSFET 212 turned off and the small discharge current is passing through a diode connected parallel with the discharge MOSFET 212.

Figure 3:
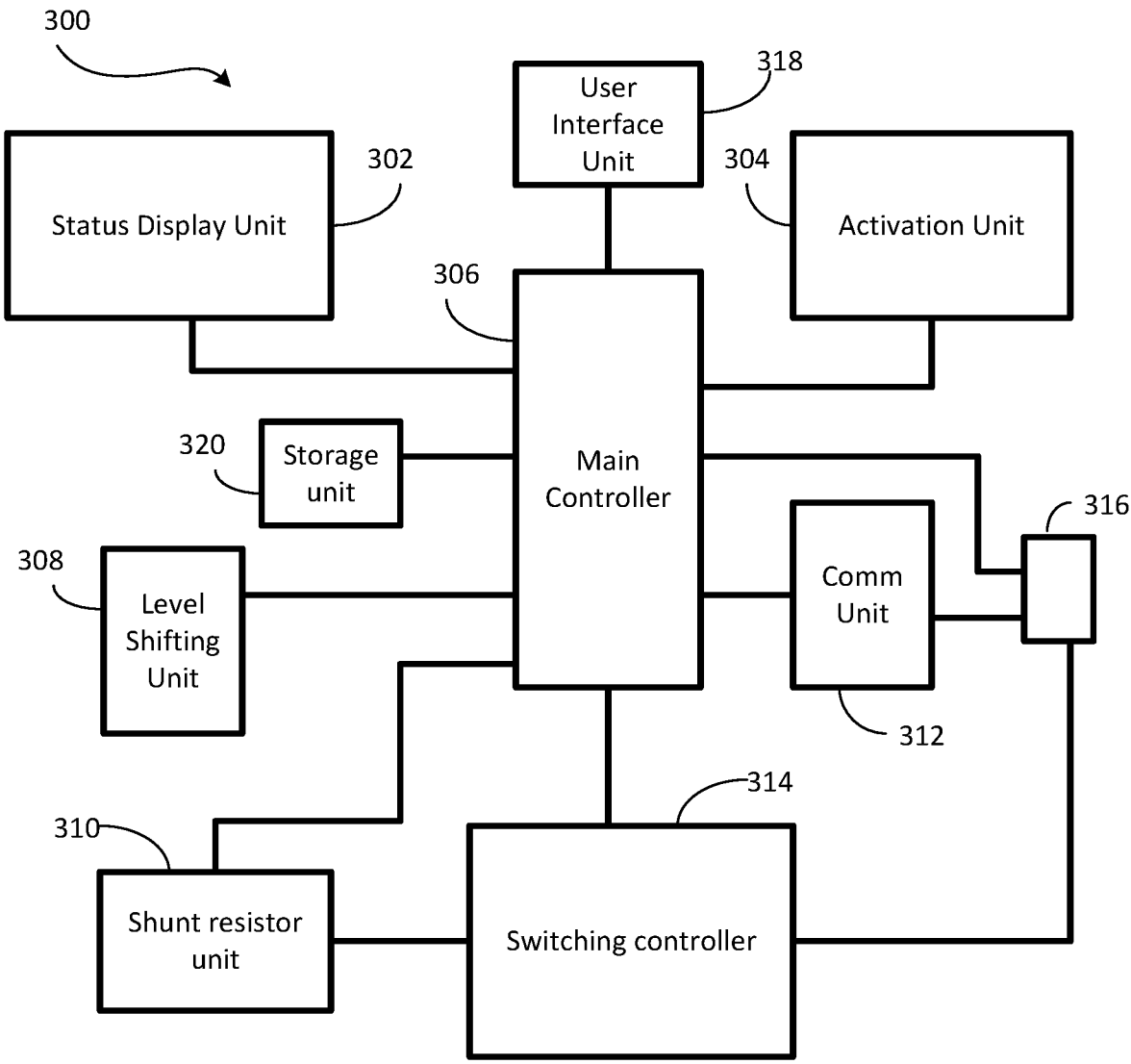
FIG. 3 depicts architecture 300 of controller chip.

FIG. 3 illustrates architecture 300 of the controller 216. The controller 216 has a status display unit 302, an activation unit 304, a level shifting unit 308, a communication unit 312, a shunt resistor unit 310, a switching controller 314, a main controller 306, a user interface unit 318, and a storage unit 320. The controller 216 communicates with outside world through a connection port 316. The main controller 306 may receive instruction and send data to other devices using the communication unit 312. The main controller 306 may also display status information through the status display unit 302. The status display unit 302 may be a LED display or other suitable means. The activation unit 304 receives the commands and sends instructions to the main controller 306. The level shifting unit 308 connects and controls the level shifter 204. The shunt resister unit 310 connects and controls the shunt resistor 206. The main controller 306 controls the charging control MOSFET 214 and the discharging control MOSFET 208 through the switching controller 314. The user interface unit 318 enables a user to input commands to wake up the battery from the protective mode or to adjust the settings of the protective mode. The storage unit 320 stores software command programs and data. The main controller 306 executes the software command programs to control the battery management system.

Figure 4:
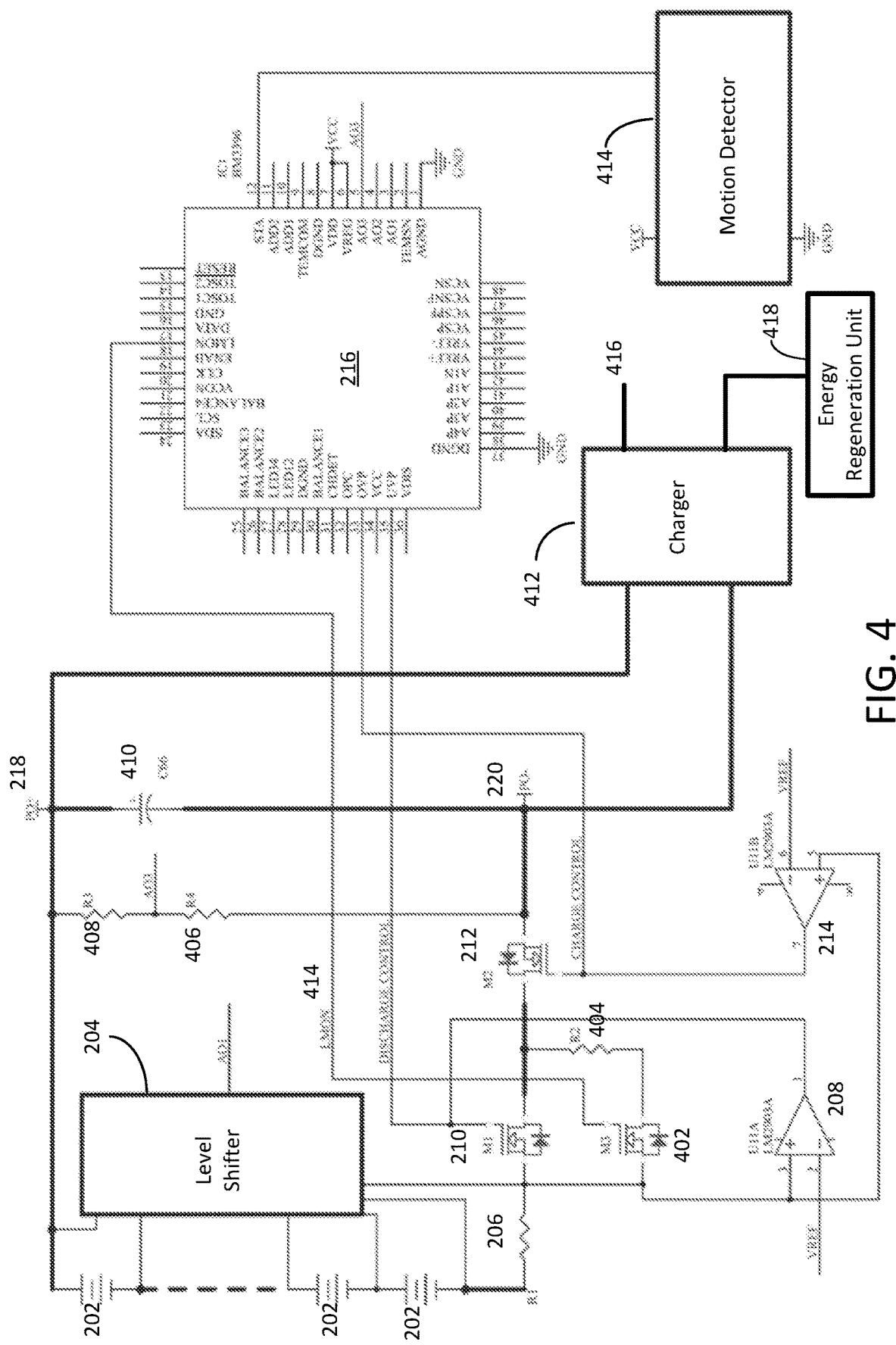
FIG. 4 depicts a circuit diagram 400 with a motion detector.

The battery charging/discharging control system of FIG. 2 is generally connected to a battery charger 412 as shown in FIG. 4. The charger 412 is connected to a power source, such as an external power source 416 and/or a power recovery system 418. The external power source 416 that can be a plug-in power outlet and the power recovery system 418 can be a system that captures power regenerated by the driving system of a golf cart. When the lithium battery is connected to a load, such as electrical motor, the delivery of the electrical current by the battery cells 202 is controlled by the discharge control MOSFET 212. When the charger 412 is connected to the external power source to charge the battery cells 202, the charging operation is controlled by the charge control MOSFET 210.

The battery charging/discharging control system of the present invention is designed to provide a smooth replacement of lead-acid battery by lithium battery and to achieve this objective it is necessary for the lithium battery to behave in a similar manner as the lead-acid battery during the charging and discharging operations. During a normal operation of the lead-acid battery, the output voltage of the lead-acid battery impacts the operation of the charger and the load. If the lithium battery were to replace the lead-acid battery, the lithium battery must have similar output voltage.

The output voltage of the lead-acid battery drops as the lead-acid battery continues to provide electrical current to a load. For a lead-acid battery of 48 V, the normal operating range is between 36 V and 57.6 V and for a lead-acid battery of 24 V, the normal operating range is 18 V to 28.8 V. So a replacement lithium battery must also operate within these ranges. However, if the output voltage of the lithium battery drops below a certain threshold, the lithium battery will enter into a under voltage protective (UVP) mode and turns off the output when the output voltage or the current drop below a certain level. Normally when the lithium battery enters into the UVP mode and the output is cut off, the load or the charger cannot detect the output voltage and as consequence the charger or the load cannot operate normally. Similarly, if the voltage at a lithium battery is above a certain threshold during a charging operation, the lithium battery will enter into an over voltage protective (OVP) mode and turns off the input. The voltage level that each lithium battery enters into either the UVP mode or the OVP mode depends on the characteristics of each lithium battery.

To ensure that the lithium battery can operate in the way that is compatible with the lead-acid battery system, the battery management system of the present invention needs to cause the lithium battery to generate an output voltage that is in the normal working range of the lead-acid battery and this is accomplished by the battery management system adaptively enabling the output voltage of the lithium battery while the lithium battery is in the protective mode. The controller 216, through the circuit shown in FIG. 4, will enable a simulated output voltage in the normal working range of the lead-acid battery. By providing the simulated output voltage, the charging operation will be enabled and the charger 412 will be able to charge the lithium battery cells 202. The charging operation is the same as described above. Similarly, the controller 216 will also enable a simulated output voltage that enables the lithium battery to discharge in a manner similar to the lead-acid battery.

When a lithium-ion battery enters the protective mode and stops to output voltage between the connectors 218 and 220, the controller 216 will enable the battery to deliver a predefined output voltage intermittently according to the principles of the PWM. The predefined output voltage is adjusted according to the characteristics of the battery. For example, during discharge, when the output voltage of the battery cells 202 drops below a predefined level, measured by the current through the resistor 206, the battery enters into the under voltage protective mode, so the battery cells 202 will not be completely depleted, thus damaged. When in the under voltage protective mode, the MOSFET 212 is shut down (closed) and no voltage is outputted. The controller 216 controls an emulator MOSFET 402 and opens the emulator MOSFET 402 periodically, so that a voltage is made available at the terminals 218 and 220. The current from the battery cells 202 passes through the emulator MOSFET 402 and a resistor 404 in pulse mode. Capacitor 410 is used to attenuate the voltage fluctuation between the terminals 218 and 220. The controller 216 adjusts the control of the emulator MOSFET 402, so the properly voltage and the duration of voltage delivered can be adjusted according to the characteristics of the lead-acid battery that the lithium-ion battery is emulating. The duration and level of the output voltage can be adjusted by the controller 216. The controller 216 adjusts the control function according to the following equations.

Control (F)=(battery cell voltages, battery cell temperatures, external voltage, battery cell current)

Battery cell voltages—voltage at each battery cell

Battery cell temperatures—temperature of each battery cell

External voltage—voltage at output terminals of the battery

Battery cell current—current measured at resistor 206

By providing a simulated output voltage between the output terminals 218 and 220, the battery will preserve its charge while making the battery part of the battery bank and detectable by the charger.

In another example, during a charging process, when the voltage of the battery cells 202 reaches a predefined level, the battery enters into the over voltage protective mode, so the battery cells 202 will not be over charged, thus damaged. When in the over voltage protective mode, the MOSTFET 210 is shut down (closed) and no voltage is outputted. The controller 216 controls the emulator MOSFET 402 and opens the emulator MOSFET 402 periodically, so that a voltage is made available at the terminals 218 and 220. The current from the battery cells 202 passes through the emulator MOSFET 402 and the resistor 404 in pulse mode. Capacitor 410 is used to attenuate the voltage fluctuation between the terminals 218 and 220. The controller 216 adjusts the control of the emulator MOSFET 402 in a similar manner as described above, so the properly voltage can be detected by the charger and the battery continues to be part of the battery bank.

Figures 5, 6:
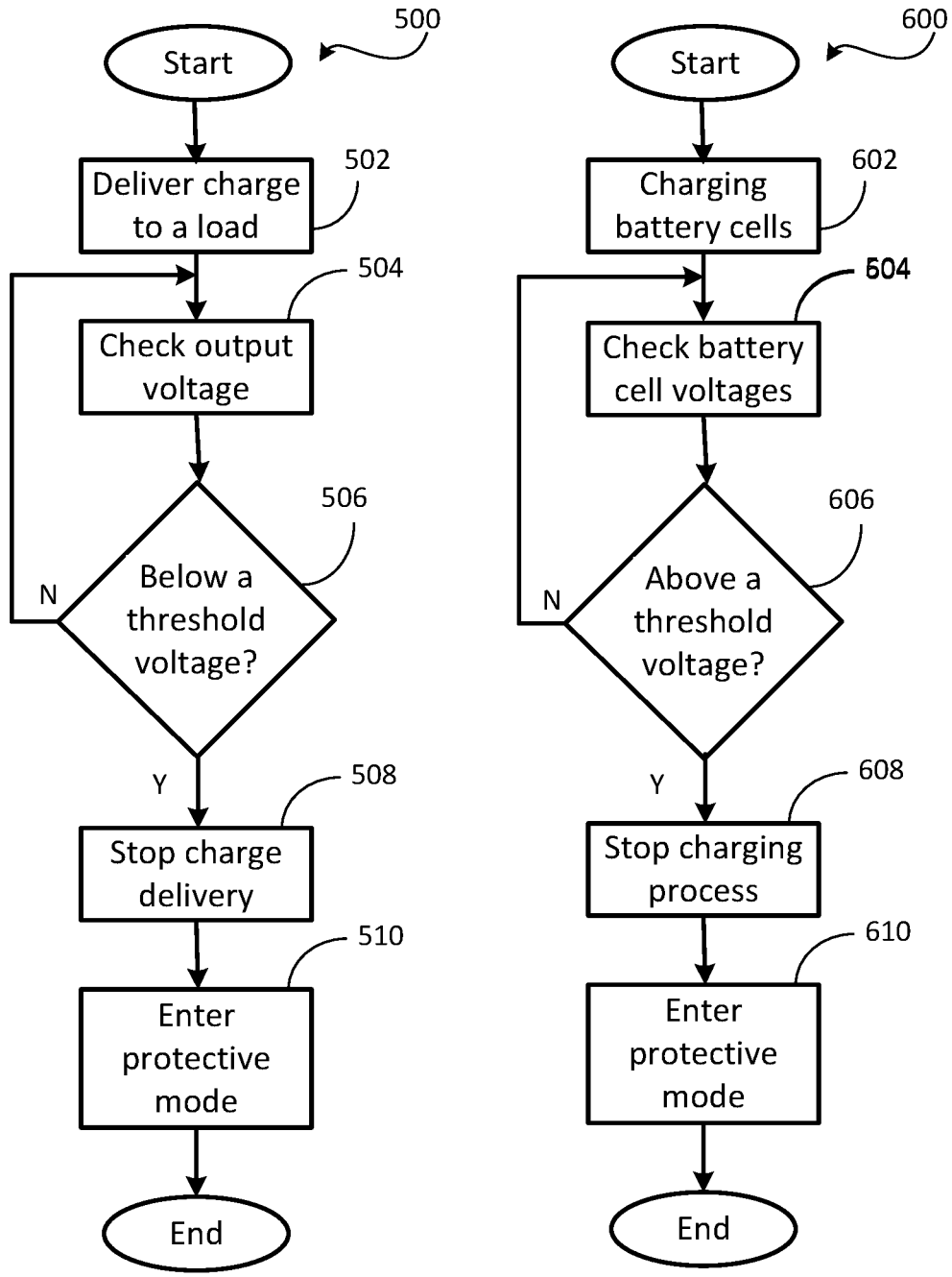
FIG. 5 is a flowchart 500 for the charge delivery process.
FIG. 6 is a flowchart 600 for the battery charging process.

FIG. 5 is a flow chart 500 of a discharge operation. When the battery is connected to a load, the battery delivers the charge to the load, step 502. As the battery drives the load, the charge is delivered to the load and the voltage of the battery drops. The discharge control unit of the battery management of the battery continuously monitors the output voltage, step 504. When the output voltage drops below a predefined threshold level, step 506, the discharge control unit of battery management system will stop the charge delivery process, stop 508, so the battery cells will not be completely depleted and damaged. As the battery stops driving the load, the battery management system causes the battery to enter into a under voltage protective mode, step 510. In this under voltage protective mode, the battery will output a predefined voltage for a short period of time, in pulse mode, so that the life the battery can be extended for a longer time and when the battery is later connected to a charger, the charger will detect the presence of the battery, then start the charging process.

FIG. 6 is a flow chart 600 for a charging operation. The charger will detect the battery and verify that the battery has the expected electrical properties before starting the charging operation, step 602. The charging control unit of the battery management system monitors the battery cells continuously and this includes checking the battery cell voltages, step 604. If the battery cell voltages are above a predefined threshold voltage, step 606, the charging control unit of the battery management system will stop the charging process, step 608, and enters the over voltage protective mode by isolating the battery cells from the output terminals and emulating a voltage at the output terminals. While in the output terminals are connected to the charger and have a high charging voltage, the battery will be in the over voltage protective mode, so the battery cells are prevented from outputting its voltage, thus preventing charging another battery connected in parallel.

When the battery has depleted charge and enters the under voltage protective mode, the battery management system enables the battery to output a low voltage periodically at the output terminals. A timer may be set by the user through the user interface unit 318 to control the duration of the under voltage protective mode. At the expiration of the timer, the battery will exit the protective mode and the battery management system will shut down the battery, so the battery cells will not be damage. The user may use the user interface unit to set the frequency of the output voltage, so the charge of the battery can be preserved for a longer time period. Alternatively, the user may use the user interface unit 318 to shut down the battery. The user may also use the user interface unit to wake up the battery from the under voltage protective mode. The user can check the status of each individual battery cell by making the selection through the user interface unit and the status of the selected battery cell will be displayed by the status display unit 302.

Figure 7:
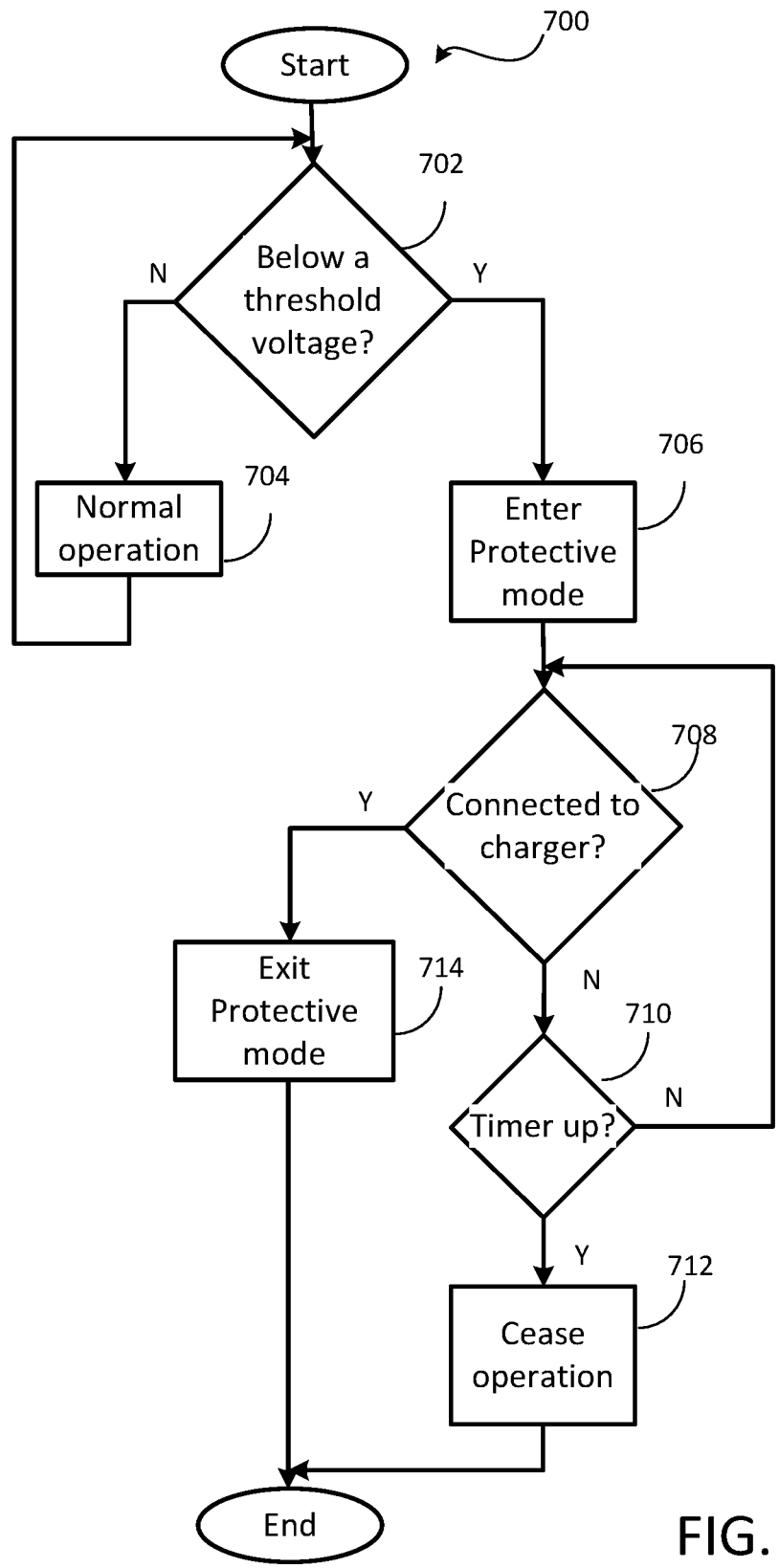
FIG. 7 is a flowchart 700 for the protective mode.

FIG. 7 illustrates an exemplary operation 700 of the battery management system. When the battery management system detects the output voltage at the terminals 218, 220 is below a predefined threshold voltage, step 702, the battery management system will cause the battery to enter the under voltage protective mode, step 706. If the terminal voltage is above the predefined threshold voltage, the normal operation of the battery will continue, step 704. While in the under voltage protective mode, the battery management system will cause the battery to emulate a lead-acid battery by outputting a low voltage periodically (pulse mode). This burst low voltage is important because it enables a charger to detect the presence of the battery. When the battery management system detects that the battery is connected to a charger, i.e., the voltage at the output terminals are higher than a predetermined voltage, step 708, the battery management system will cause the battery to exit the under voltage protective mode, step 714, and the charge operation will start. While the battery enters into the under voltage protective mode, a timer is started. When the timer expired, step 710, the battery management system will stop the operation, step 712. The timer is used to avoid the complete depletion of the battery cells, thus damaging the battery cells. The timer and the frequency of the voltage output can be adjusted by the user through the user interface. The user can choose to lower the frequency of the output voltage and extend the timer, so the battery will present an output voltage at the terminals less often but for a longer time period.

While in the under voltage protective mode, the battery management system will indicate that the battery is in the protective mode. The user may "wake up" the battery by inputting a command through the user interface unit 318. The wake up command will instruct the battery management system to interrupt the protective mode.

The status display unit 302 is connected to a LED display and will display battery status, stage of charge, operating mode, charging status, and error codes.

When in use, the lithium batteries equipped with the battery management system of the present invention can be connected in parallel through their respective output connectors 218, 220 to an external load, thus enabling delivery of a large combined current. During the charging process, the charger 412 delivers a charging current to each of the lithium batteries. The charging current flows through the output connector 218, the battery cells 202, the shunt resistor 206, the MOSFETs 210, 212, and exits at the output connector 220. When the battery cells are depleted, the charging current is a constant current and the charging current gradually diminishes as the battery cells are charged up. The charging current is detected by the shunt resistor 206 and the voltage drop at the shunt resistor is compared with a reference voltage at the comparator 208, which controls the MOSFET 210. When the charging current is large and the voltage drop is large than the reference voltage, the MOSFET 210 is turned ON and the charging current flows through the MOSFET 210.

When the charging current is small because the battery cells are charged up, the comparator 208 detects the voltage drop at the shunt resistor 206 is small and turns OFF the MOSFET 210. When the MOSFET 210 is OFF, the small charging current flows through the diode that is connected in parallel to the MOSFET 210. During the charging process, MOSFET 212 is ON. Because the MOSFET 210 is OFF and the small charging current continues to flow through the diode, this prevents this lithium battery from accidentally discharging and damaging a similarly connected neighboring lithium battery.

During the discharging process, the discharge current flows in the reverse direction. The discharge current flows from the battery cells 202, through the output connector 218, the external load, back to the output connector 220, MOSFETs 212, 210, and the shunt resistor 206. The discharge current is initially large and gradually diminishes. The MOSFET 212 is ON when the discharge current is larger and will be turned OFF by the comparator 214 when the discharge current, as detected by the shunt resistor 206, diminishes. The MOSFET 210 is ON during the discharging process.

When the discharge current drops to a low level, in order to prevent the damage to the battery cells 202, the MOSFET 212 is turned OFF and the small discharge current passes through a diode that is connected in parallel to the MOSFET 212. The small current enables the charger 412 to detect the presence of the lithium battery. The small current can be output in PWM mode or PFM mode as described above, such that the shelf life of the lithium battery can be extended.

The MOSFETs 210, 212 controls the path of the current flowing through the lithium battery and their operation is controlled by the controller 216 and the comparators 208, 214. The MOSFETs operations can be summarized in the table below.

|  |  | MOSFET 210 | MOSFET 212 |
|---|---|---|---|
| Charging | Voltage > Ref | ON | ON |
|  | Voltage < Ref | OFF | ON |
| Discharging | Voltage > Ref | ON | ON |
|  | Voltage < Ref | ON | OFF |

At the end of the discharging process, when each battery cell is depleted, the MOSFET 210 will be OFF. As the MOSFET 210 is turned OFF, the emulator MOSFET 402 is turned on periodically in the pulse mode as described above, the resistors 404, 406, 408 are in parallel, delivering the voltage to the output connectors 218, 220. By selecting an appropriate resistors, the lithium battery can be designed to emulate a specific voltage that a charger expects to detect before starting the charging process.

When the battery is shipped after being manufactured, the battery can be set up for the ship mode and there is no output voltage on the terminals 218, 220. The battery will exit the ship mode if it is connected to a charger 412 or a command is received from the user interface unit 318. When the battery exits from the ship mode, the emulator MOSFET 402 is ON periodically in pulse mode as described above and the frequency of the pulse mode can be adjusted by through the user commands. By adjusting the pulse mode, the shelf life of the battery can be extended. By making voltage available at the output terminals, the availability of the battery can be detected by the load or the charger once the battery is put in use. The duration of outputting a voltage in the pulse mode can be adjusted by the timer as previously described.

The battery management system of the present invention can be further coupled to an energy regeneration unit 418 that captures the energy recaptured during breaking of a moving vehicle or a golf cart, as shown in FIG. 4. The energy regeneration unit 418 can be assembled onto any system that dissipates energy in certain operational cycles. The dissipated energy can be recaptured by the energy regeneration unit 418 and used to charge the rechargeable battery. The charger 412 can charge the rechargeable battery using energy from an external power source 416 (not shown) or from the energy regeneration unit 418. The energy regeneration unit 418 may be alternatively connected to a separate charger and a switch (not shown) may be used to select whether to charge the battery using the charger connected to an external power source 416 or using the recaptured energy from the energy regeneration unit 418.

The determination on whether to connect the energy regeneration unit 418 to the charger 412 is controlled by the controller 216 and the controller 216 makes such determination based on the information (motion indicator) received from a motion detector 414 and the voltage detected at the output port of the energy regeneration unit 418. The motion detector 414 and the controller 216 can be implemented in a single chip or alternatively as separate devices. The motion detector 414 is capable of indicating whether the vehicle on which it is mounted is in motion or not.

Figure 8:
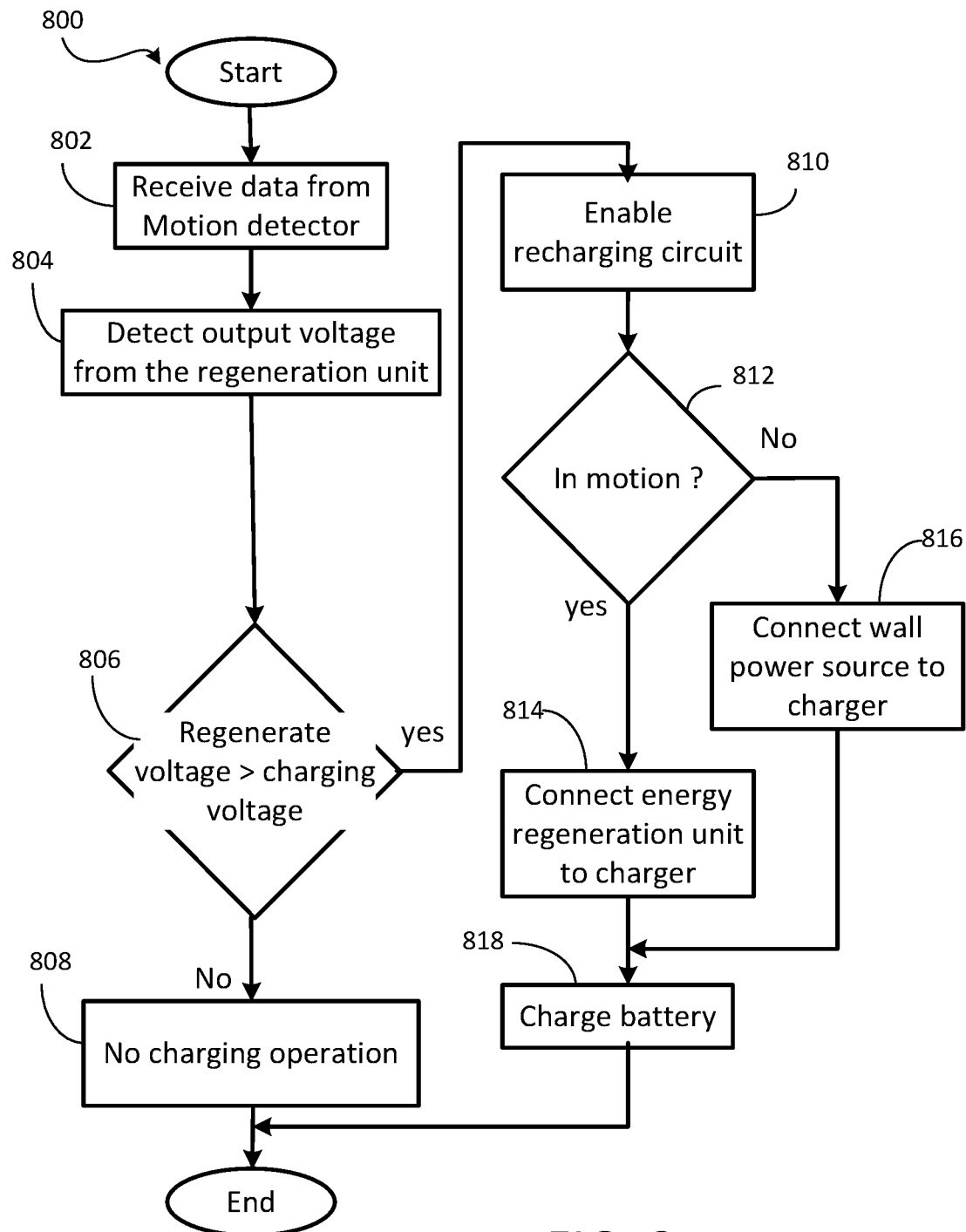
FIG. 8 is a flowchart 800 for charging the battery with regenerated energy.

FIG. 8 is a flowchart 800 of recharging operation for the battery management system equipped with a motion detector 414 and connected to an energy regeneration unit 418. The controller 216 receives data from the motion detector 414 that indicates whether the vehicle or the golf car is in motion, step 802. The controller 216 also monitors the output voltage from the energy regeneration unit 418, step 804. If the output voltage from the energy regeneration unit 418 is smaller (not larger) than the charging voltage for the battery, step 806, which indicates that no recaptured energy is available, then no charging operation is needed, step 808. If the output voltage from the energy regeneration unit 418 is larger than the battery, then the recharging circuit is enabled, step 810, and the energy regeneration unit 418 is connected to the charger 412. The recharging circuit is in the charger 412. It is checked if the vehicle is in motion, step 812. If the vehicle is in motion, then the energy regeneration unit 418 is connected to the charger 412, step 814, and the energy from the energy regeneration unit 418 is used to charge the battery, step 818. If the vehicle is not in motion, then the charger 412 is connected to an external power source, step 816, and uses the voltage from this power source to charge the battery. The steps illustrated by FIG. 8 may be executed in different sequence to achieve the same result. The information on the charging voltage for the battery may be retrieved from a storage unit connected to the controller 216 or retrieved from the battery.

Figure 9:
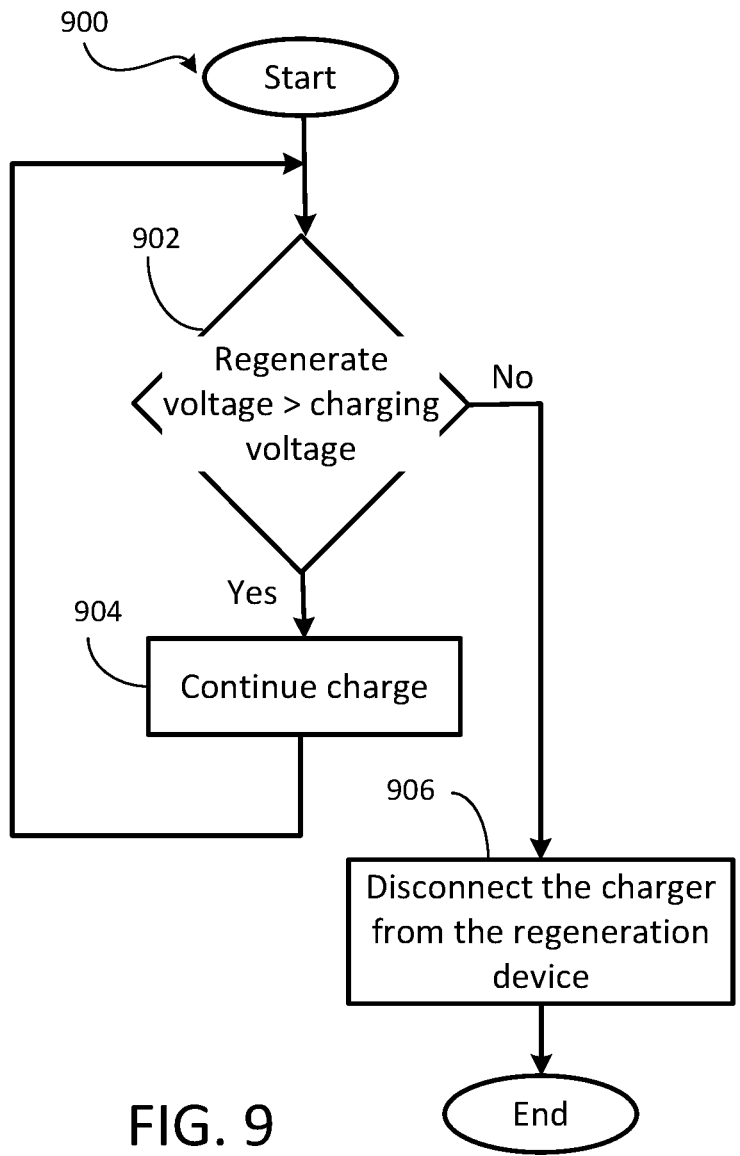
FIG. 9 is flowchart 900 for stopping the charging process.

FIG. 9 is a flowchart 900 for operation of stopping the charging process. While the battery is being charged with the recaptured energy from the energy regeneration unit 418, the controller 216 continuously monitors the output voltage from the energy regeneration unit 418. As the energy is consumed, the output voltage from the energy regeneration unit 418 drops. When the output voltage is higher than the charging voltage for the battery, the charging operation continues, step 904. When the output voltage drops below the charging voltage, step 902, the controller 216 will instruct the charger 412 to shut down the recharging circuit and the energy regeneration unit 418 is disconnected from the charger 412, step 906. The shutting down of the connection between the battery and the energy regeneration unit 418 stops the charging operation.

During the recharging processing using the energy from the energy regeneration unit 418, the same protection of the battery cells against overcharging is afforded as described above by FIG. 6 and related description.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated. The combinations of different features described in different embodiments in this specification are foreseeable and within the scope of the invention.

In the context of FIGS. 5-8, the steps illustrated do not require or imply any particular order of actions. The actions may be executed in sequence or in parallel. The method may be implemented by the controller executing a sequence of machine-readable instructions. The instructions can reside in various types of signal-bearing or data storage media.

What is claimed is as follows:

1. A method for recharging a battery in a vehicle equipped with a battery management system and connected to an energy regeneration device, the method comprising:
    receiving an output voltage from the energy regeneration device;
    receiving an indicator that the vehicle is in motion;
    comparing the output voltage from the energy regeneration device with a charging voltage for the battery; and
    if the output voltage is larger than the charging voltage and the motion indicator indicates motion, then charging the battery with the energy regeneration device.

2. The method of claim 1, further comprising retrieving the charging voltage from a storage unit.

3. The method of claim 1, further comprising connecting the energy regeneration unit to a charger.

4. The method of claim 1, further comprising, if the output voltage is not larger than the charging voltage and the motion indicator indicates motion, then no charging is performed.

5. The method of claim 1, further comprising, if the output voltage drops below the charging voltage during the charging, shutting down the energy regeneration device.

6. A vehicle with a battery with a management system connected to an energy regeneration device, the battery in the vehicle comprising:
    a plurality of battery cells;
    a charger connected to the plurality of battery cells; and
    a controller connected to the plurality of the battery cells and to the charger,
    wherein
    the controller receives an indicator that the vehicle is in motion, and
    the controller enables a connection between the energy regeneration device and the charger to charge the plurality of battery cells if the indictor indicates motion and an output voltage from the energy regeneration device is larger than a charging voltage for the plurality of battery cells.

7. The battery of claim 6, wherein the motion detecting device is embedded inside the controller.

8. The battery of claim 6, wherein the controller disables the connection between the energy regeneration device and the charger if the output voltage from the energy regeneration device is smaller than a charging voltage for the plurality of battery cells.

9. The battery of claim 6, wherein, if the output voltage from the energy regeneration device is smaller than a charging voltage for the plurality of battery cells, then no charging operation is performed.

10. A battery management system for a vehicle with an energy regeneration device and a battery, the battery management system comprising:
    a storage unit with a plurality of machine-readable instructions;
    a controller retrieving the plurality of machine-readable instructions, wherein the machine-readable instructions executed by the controller causes the battery management system to
    receive an output voltage from the energy regeneration device;
    receive an indicator from the vehicle;
    compare the output voltage from the energy regeneration device with a charging voltage for the battery; and
    if the output voltage is larger than the charging voltage and the indicator indicates the vehicle is in motion, then charge the battery with the energy regeneration device.

11. The battery management system of claim 10, wherein the machine-readable instructions executed by the controller further causes the battery management system to retrieve the charging voltage from the storage unit.

12. The battery management system of claim 10, wherein the machine-readable instructions executed by the controller further causes the battery management system to connect the energy regeneration unit to the charger.

13. The battery management system of claim 10, wherein the machine-readable instructions executed by the controller further causes the battery management system to, if the output voltage is not larger than the charging voltage and the indicator indicates the vehicle is in motion, then do not charge the battery with the energy regeneration device.

14. The battery management system of claim 10, wherein the machine-readable instructions executed by the controller further causes the battery management system to, if the output voltage drops below the charging voltage during the charging, shut down the energy regeneration device.

* * * * *